United States Patent
Yang

(10) Patent No.: US 7,630,218 B2
(45) Date of Patent: Dec. 8, 2009

(54) VOLTAGE CONVERTER CAPABLE OF CORRECTLY ENABLING SECONDARY CONVERTING MODULE COUPLED TO OUTPUT PORT OF VOLTAGE CONVERTER BY UTILIZING SLOPE INDICATION SIGNAL HAVING DIFFERENT PULSE AMPLITUDES REPRESENTATIVE OF DIFFERENT SLOPE VALUES

(75) Inventor: Hui-Tsung Yang, Taipei County (TW)

(73) Assignee: Silicon Touch Technology Inc., Hsin-Chu (TW)

( * ) Notice: Subject to any disclaimer, the term of this patent is extended or adjusted under 35 U.S.C. 154(b) by 494 days.

(21) Appl. No.: 11/695,067

(22) Filed: Apr. 2, 2007

(65) Prior Publication Data

US 2008/0239773 A1    Oct. 2, 2008

(51) Int. Cl.
*H02M 3/335*    (2006.01)
(52) U.S. Cl. .................. 363/21.12; 363/127; 363/80
(58) Field of Classification Search ... 363/21.12–21.18, 363/127, 80
See application file for complete search history.

(56) References Cited

U.S. PATENT DOCUMENTS 6,456,106 B1    9/2002   Yee
6,711,039 B2 *  3/2004   Brkovic ...................... 363/127
7,397,229 B2 *  7/2008   Halberstadt ................. 323/284
7,515,442 B2 *  4/2009   Mikulenka et al. ........ 363/21.12
2005/0206327 A1 * 9/2005 Hsu et al. ................... 315/276

* cited by examiner

*Primary Examiner*—Adolf Berhane
*Assistant Examiner*—M. G.
(74) *Attorney, Agent, or Firm*—Winston Hsu

(57) ABSTRACT

A method for converting an input voltage signal into an output voltage signal is disclosed. The method includes: providing a primary converting module and coupling the primary converting module to an input port of the voltage converter; providing a secondary converting module having a second electronic induction device and a switch device, coupling the secondary converting module to an output port of the voltage converter, and utilizing the switch device to enable the secondary converting module; measuring a slope of an output at a detection end of the second electronic induction device to generate a slope indication signal having different pulse amplitudes representative of different slope values; and referencing the output at the detection end of the second electronic induction device, the slope indication signal, a first predetermined reference level, and a second predetermined reference level to generate a control signal for controlling an on/off status of the switch device.

9 Claims, 8 Drawing Sheets

VOLTAGE CONVERTER CAPABLE OF CORRECTLY ENABLING SECONDARY CONVERTING MODULE COUPLED TO OUTPUT PORT OF VOLTAGE CONVERTER BY UTILIZING SLOPE INDICATION SIGNAL HAVING DIFFERENT PULSE AMPLITUDES REPRESENTATIVE OF DIFFERENT SLOPE VALUES

BACKGROUND OF THE INVENTION

1. Field of the Invention

The present invention relates to a voltage converter, and more particularly, to a voltage converter capable of correctly enabling a converting module coupled to an output port of the voltage converter.

2. Description of the Prior Art

Please refer to FIG. 1. FIG. 1 is a diagram of an example of a prior art flyback voltage converter 100. As shown in FIG. 1, the voltage converter 100 comprises a primary converting module 105 and a secondary converting module 110. The primary converting module 105 has a first electronic induction device $L_1$ and a transistor $Q_1$, and is utilized for storing energy coming from the input port of the voltage converter 100 when the transistor $Q_1$ is turned on by a control signal $S_c$, and for transferring energy stored in the first electronic induction device $L_1$ to the secondary converting module 110 when the transistor $Q_1$ is turned off by the control signal $S_c$. The secondary converting module 110 has a second electronic induction device $L_2$ and a rectifying component 112 (implemented in this example by a diode D), and is utilized for transforming energy coming from the primary converting module 105 to generate an output voltage signal $S_{out}$. Usually, the voltage converter 100 works in a continuous conduction mode; however, it may work in a discontinuous conduction mode in certain situations, for example, in a situation where the voltage converter 100 only transfers 20 Watts to the output port of the voltage converter 100 even though power coming from the input port of the voltage converter 100 is higher than 20 Watts.

Please refer to FIG. 2 in conjunction with FIG. 1. FIG. 2 is a timing diagram illustrating operation of the prior art voltage converter 100 operating in the continuous conduction mode. As shown in FIG. 2, when the transistor $Q_1$ is turned on, the voltage level $V_1$ remains at a voltage level $V_{in}$ (i.e. the voltage level of the input voltage signal $S_{in}$ shown in FIG. 1) and the first electronic induction device $L_1$ is equivalently coupled to the ground voltage level where the voltage level $V_{ds}$ is small and negligible. At this time, the current passing through the first electronic induction device $L_1$ (i.e. $I_1$) increases slowly from zero up to a limit $I_{1max}$. Once the transistor $Q_1$ is turned off (i.e. at time $t_1$), the voltage level $V_1$ will be switched to another voltage level $-(V_{out}+V_d)*N_1/N_2$ immediately and the voltage level $V_{ds}$ will become another voltage level $V_{in}+(V_{out}+V_d)*N_1/N_2$, wherein the value $N_1/N_2$ is a turns ratio between the first and second electronic induction devices $L_1$, $L_2$, and the voltage $V_d$ is a conduction voltage of the diode D when forward-biased. At this time, the current $I_1$ will become zero and the current passing through the second electronic induction device $L_2$ (i.e. $I_2$) will increase immediately, then decrease slowly from a limit $I_{2max}$ to zero to provide a voltage level of the output voltage signal $S_{out}$ (i.e. $V_{out}$). Therefore, in continuous conduction mode the currents $I_1$, $I_2$ will not become zero at the same time; this does occur, however, in discontinuous conduction mode.

Please refer to FIG. 3. FIG. 3 is a timing diagram illustrating operation of the prior art voltage converter 100 operating in discontinuous conduction mode. As shown in FIG. 3, a difference of the current $I_2$ compared to the current in FIG. 2 is that the current $I_2$ shown in FIG. 3 reaches zero at time $t_2$ and remains at zero during a time period $t_2 \sim T$. The voltage level $V_{ds}$ will then oscillate during the time period $t_2 \sim T$ due to the parasitic capacitance/inductance within the voltage converter 100 itself. The diode D can still operate correctly even though the operation of the diode D is controlled by the voltage drop across itself and the oscillation of the voltage level $V_{ds}$ also causes the voltage drop across the diode D to oscillate. An only disadvantage is that a power loss is introduced due to the voltage drop across the diode D. In general, a switch device implemented by a transistor is utilized for replacing the operation and function of the diode D in the secondary converting module 110. However, another power loss is introduced since the transistor may operate erroneously.

In general, there are two prior art schemes capable of avoiding the power loss caused by the above-mentioned transistor. One of the prior art schemes detects the current passing through the second electronic induction device $L_2$ (i.e. $I_2$) to control the transistor for avoiding the power loss. This scheme has to add a current sensing resistor or a current sensing transformer in the voltage converter 100, however. Considering total cost of the voltage converter 100, adding a current sensing resistor or current sensing transformer is not desirable.

Another prior art scheme capable of avoiding the power loss directly detects the waveform of the voltage level between the second electronic induction device $L_2$. Please refer to FIG. 4. FIG. 4 is a diagram of an example of a prior art flyback voltage converter 400 capable of avoiding the power loss. As shown in FIG. 4, the voltage converter 400 comprises a primary converting module 405, a secondary converting module 410, and a synchronous rectification controller 415. The secondary converting module 410 comprises a second electronic induction device $L_2$ and a switch device (in this example, it is implemented by a transistor $Q_2$). The synchronous rectification controller 415 is utilized for generating a control signal $V_c$ to control an on/off status of the transistor $Q_2$ in the secondary converting module 410 by directly detecting the waveform of the voltage level at the node Z shown in FIG. 4.

Please refer to FIG. 5. FIG. 5 is a timing diagram illustrating operation of the prior art voltage converter 400 operating in the discontinuous conduction mode. As shown in FIG. 5, for example, when the control signal $S_c$ remains at a high logic level during a time period $t_1 \sim t_2$, the transistor $Q_1$ in the primary converting module 405 shown in FIG. 4 is turned on. The node Z shown in FIG. 4 is regarded as a floating node since the status of the transistor $Q_2$ remains off. The voltage level at the node Z (i.e. $V_z$) then remains at a high voltage level during the time period $t_1 \sim t_2$. At time $t_2$, the second electronic induction device $L_2$ will be discharged for providing a stable voltage level of the output voltage signal $S_{out}$. The voltage level $V_z$ will be decreased to zero Volts immediately since the transistor $Q_1$ will be turned off. Once the synchronous rectification controller 415 detects an immediately decreased voltage level $V_z$ from the high voltage level to zero Volts, the transistor $Q_2$ is turned on by the synchronous rectification controller 415. Therefore, the second electronic induction device $L_2$ starts discharging for providing the stable voltage level of the output voltage signal $S_{out}$ until time $t_3$, and the synchronous rectification controller 415 can control the status of the transistor $Q_2$ by detecting the immediately decreased voltage level $V_z$. In general, detecting the immediately decreased voltage level $V_z$ is implemented by detecting a transition of the voltage level $V_z$ from the high voltage level to a low voltage level based on a reference voltage level $V_{ref}$. The voltage level $V_z$ may be unstable (i.e. the voltage level $V_z$ may oscillate) during a time period $t_3$~$t_5$, however, since the node Z is regarded as a floating node as mentioned above. It is possible for the synchronous rectification controller 415 to detect a transition of the unstable voltage level $V_z$ and thus the transistor $Q_2$ is erroneously turned on by the synchronous rectification controller 415. For example, the transistor $Q_2$ is erroneously conducted in a time period $t_4$~$t_5$ shown in FIG. 5. This will cause another problem for detecting the voltage level $V_z$ to control the transistor $Q_2$. Therefore, controlling the transistor $Q_2$ only by detecting a transition of the voltage level $V_z$ based on the reference voltage level $V_{ref}$ has some disadvantages.

For solving the above-mentioned problem, the prior art scheme further generates a sensor pulse according to a plurality of predetermined levels $V_A$, $V_B$ and a transition of the voltage level $V_z$ from the high voltage level to the low voltage level. The sensor pulse and a reference pulse will be compared to determine whether the transition of the voltage level $V_z$ is stable (i.e. the voltage level $V_z$ does not oscillate at this time). Please refer to FIG. 6. FIG. 6 is a diagram illustrating two operation results of the prior art voltage converter 400 according to different transitions of the voltage level $V_z$ and the reference pulse. As shown in FIG. 6, the left part of this diagram shows operation of the voltage converter 400 under the condition of a transition of an unstable voltage level $V_z$, while the right part of this diagram shows operation of the voltage converter 400 under the condition of a transition of a stable voltage level $V_z'$. Usually, a transition time of the unstable voltage level $V_z$ is much longer than that of the stable voltage level $V_z'$. For example, the transition time of the unstable voltage level $V_z$ from a high voltage level $V_A$ to a low voltage level $V_B$ may be up to 250 nanoseconds, yet the transition time of the stable voltage level $V_z'$ from the high voltage level $V_A$ to the low voltage level $V_B$ is only up to 50 nanoseconds. The synchronous rectification controller 415 can turn on the transistor $Q_2$ correctly by the sensor pulses $T_{AB}$, $T_{AB}'$ and the reference pulse $T_{ref}$. For example, the synchronous rectification controller 415 turns on the transistor $Q_2$ when it detects that the width of the sensor pulse $T_{AB}'$ is shorter than that of the reference pulse $T_{ref}$, and turns the transistor $Q_2$ off when detecting that the width of the sensor pulse $T_{AB}$ is longer than that of the reference pulse $T_{ref}$. A primary defect of utilizing the above-mentioned sensor pulses is that the voltage level at the node Z in this voltage converter may be slightly different from that in another voltage converter. It is very possible that the sensor pulse $T_{AB}'$ does not correspond to a period when the voltage level $V_z'$ transits from the predetermined level $V_A$ to the predetermined level $V_B$ (i.e. the period that the voltage level $V_z'$ changes very sharply). If serious enough, a stable waveform of the voltage level at the node Z could be erroneously regarded as an unstable waveform. For instance, a stable waveform of a voltage level at the node Z in a different voltage converter could be regarded as an unstable waveform since the predetermined level $V_A$ may be changed due to process drift. Another defect of the sensor pulses is that a starting timing of a pulse utilized for conducting the transistor Q2 of FIG. 4 is later than an ending timing of the reference pulse Tref. However, during the reference pulse Tref, the transistor Q2 may be turned on by its body diode voltage even though the control signal Vc generated from the synchronous rectification controller 415 is zero. Thus additional power dissipation may be introduced.

The present invention provides a new scheme for solving the above-mentioned problems in the discontinuous conduction mode without generation and comparison of the sensor pulse and the reference pulse.

SUMMARY OF THE INVENTION

One of the objectives of the present invention is to provide a voltage converter capable of correctly enabling a secondary converting module by measuring a slope of an output at the second end of a second electronic induction device to generate a slope indication signal having different pulse amplitudes representative of different slope values, in order to solve the above-mentioned problem without requiring the reference pulse.

According to the claimed invention, a voltage converter for converting an input voltage signal into an output voltage signal is disclosed. The voltage converter comprises a primary converting module, a secondary converting module, and a switch controller. The primary converting module, having a first electronic induction device, is coupled to an input port of the voltage converter. The secondary converting module comprises a second electronic induction device and a switch device. The second electronic induction device is coupled to the first electronic induction device and it comprises a first end and a second end. The first end of the second electronic induction device is coupled to an output port of the voltage converter. The switch device is coupled to the second end of the second electronic induction device and utilized for enabling the secondary converting module when switched on. Additionally, the switch controller is coupled to the switch device and the second electronic induction device and it comprises a slope detecting circuit and a decision circuit. The slope detecting circuit is coupled to the second end of the second electronic induction device and utilized for measuring a slope of an output at the second end of the second electronic induction device to generate a slope indication signal having different pulse amplitudes representative of different slope values. The decision circuit is coupled to the slope detecting circuit and the switch device, and utilized for referencing the output at the second end of the second electronic induction device, the slope indication signal, a first predetermined reference level, and a second predetermined reference level to generate a control signal for controlling an on/off status of the switch device.

According to the claimed invention, a method for converting an input voltage signal into an output voltage signal is disclosed. The method comprises: providing a primary converting module having a first electronic induction device and coupling the primary converting module to an input port of the voltage converter; providing a secondary converting module comprising a second electronic induction device and a switch device, coupling a first end of the second electronic induction device to an output port of the voltage converter and a second end of the second electronic induction device to the switch device, and utilizing the switch device to enable the secondary converting module; measuring a slope of an output at the second end of the second electronic induction device to generate a slope indication signal having different pulse amplitudes representative of different slope values; and referencing the output at the second end of the second electronic induction device, the slope indication signal, a first predetermined reference level, and a second predetermined reference level to generate a control signal for controlling an on/off status of the switch device.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
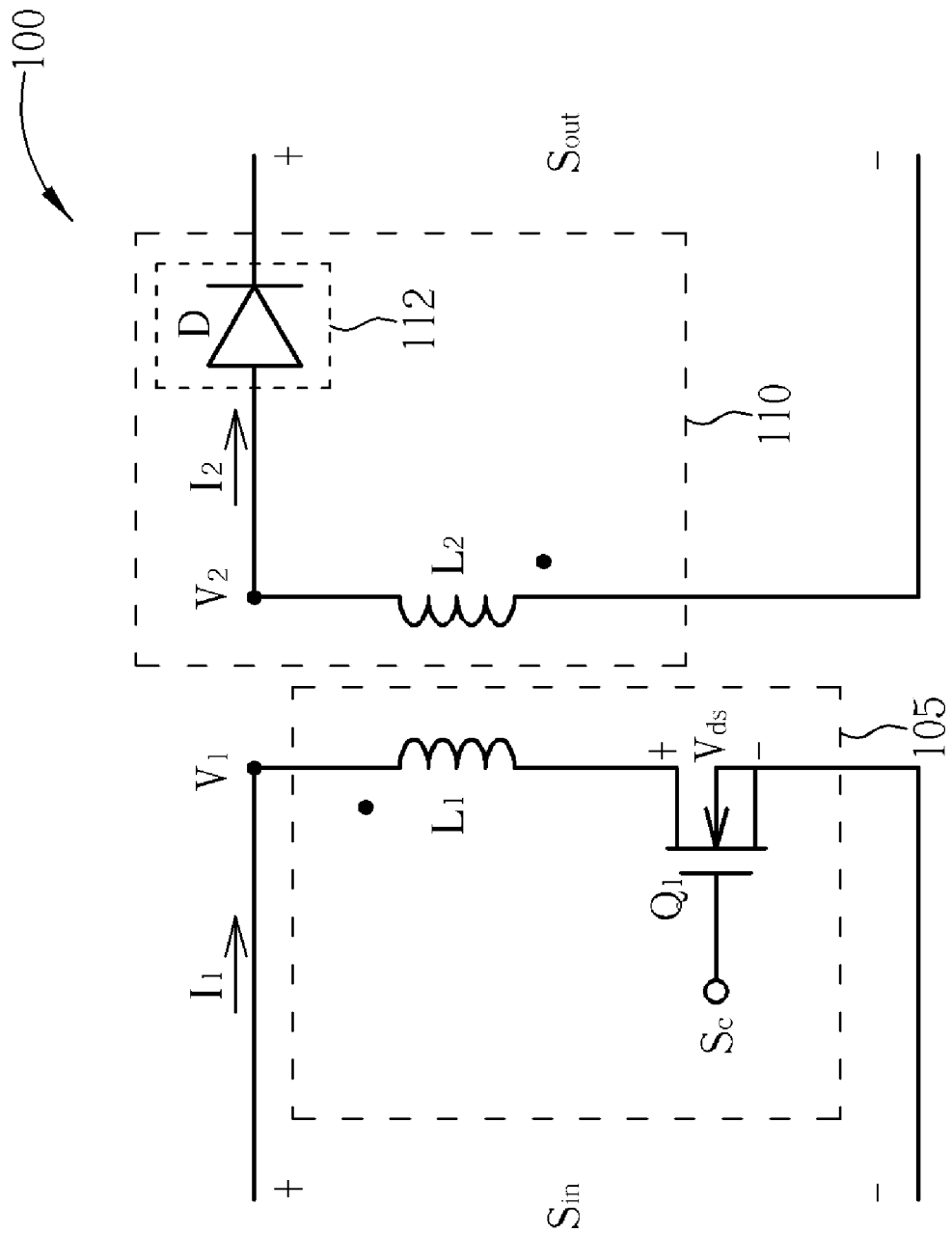
FIG. 1 is a diagram of an example of a prior art flyback voltage converter.
Figure 2:
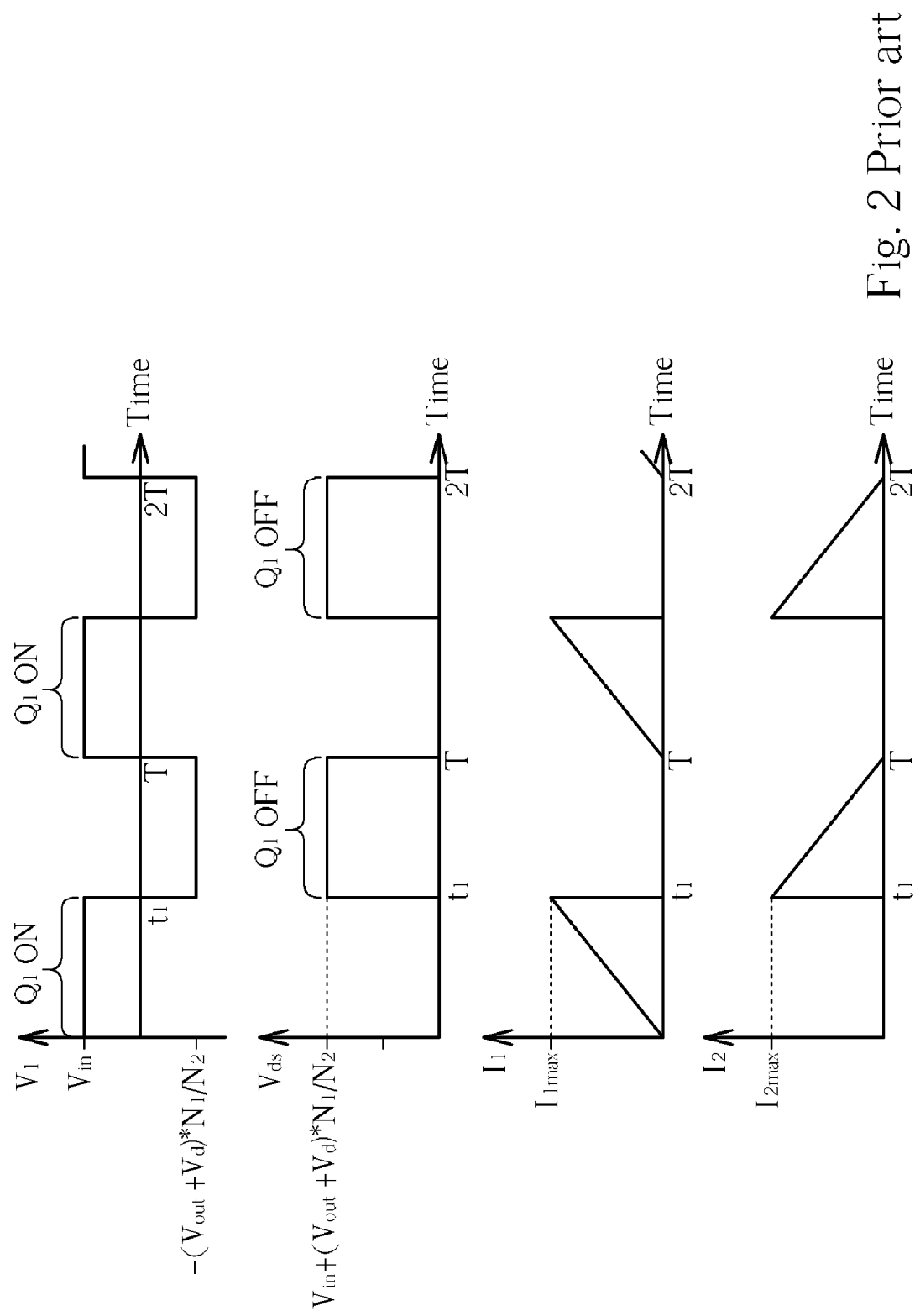
FIG. 2 is a timing diagram illustrating operation of the prior art voltage converter shown in FIG. 1 operating in continuous conduction mode.
Figure 3:
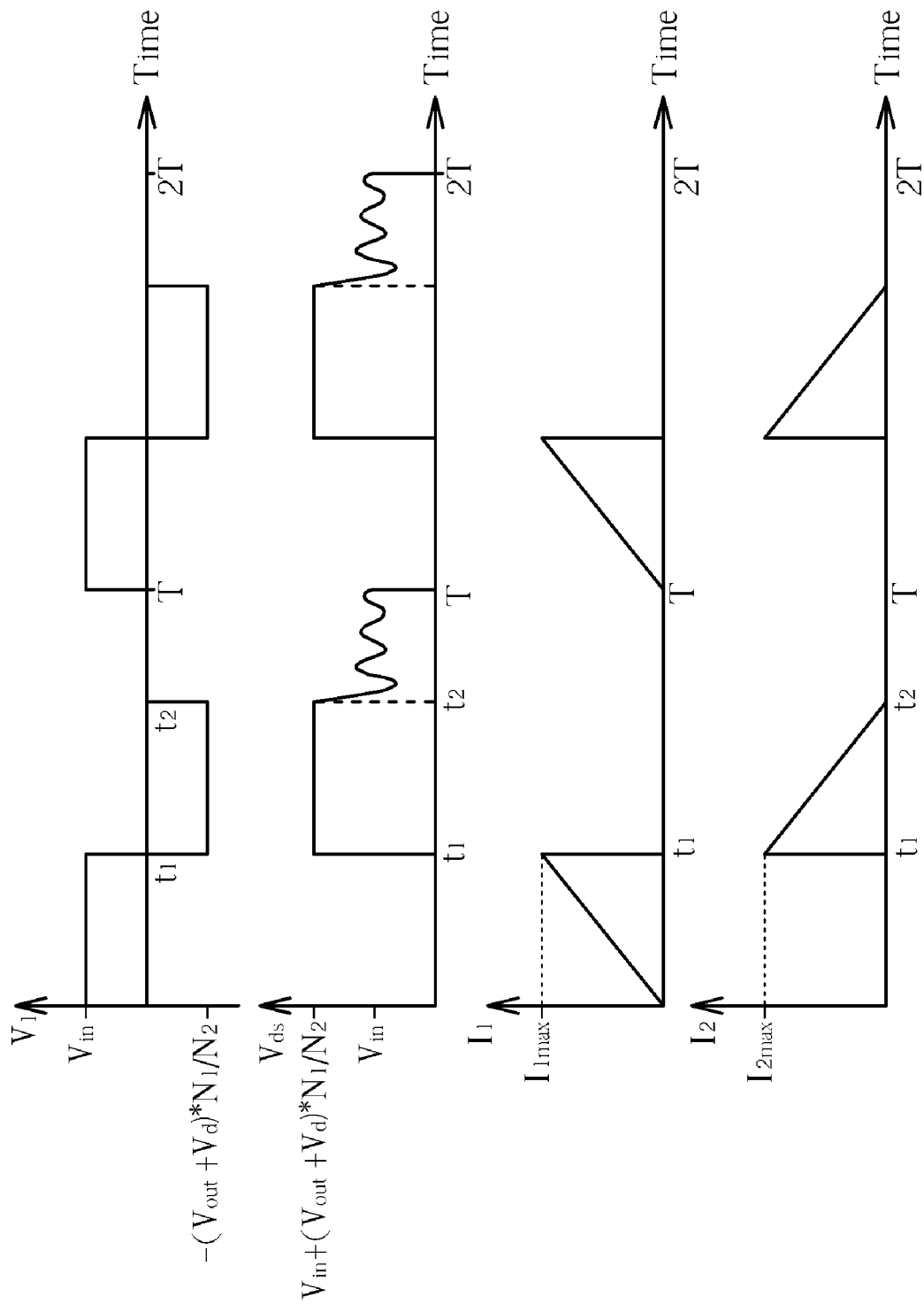
FIG. 3 is a timing diagram illustrating operation of the prior art voltage converter shown in FIG. 1 operating in discontinuous conduction mode.
Figure 4:
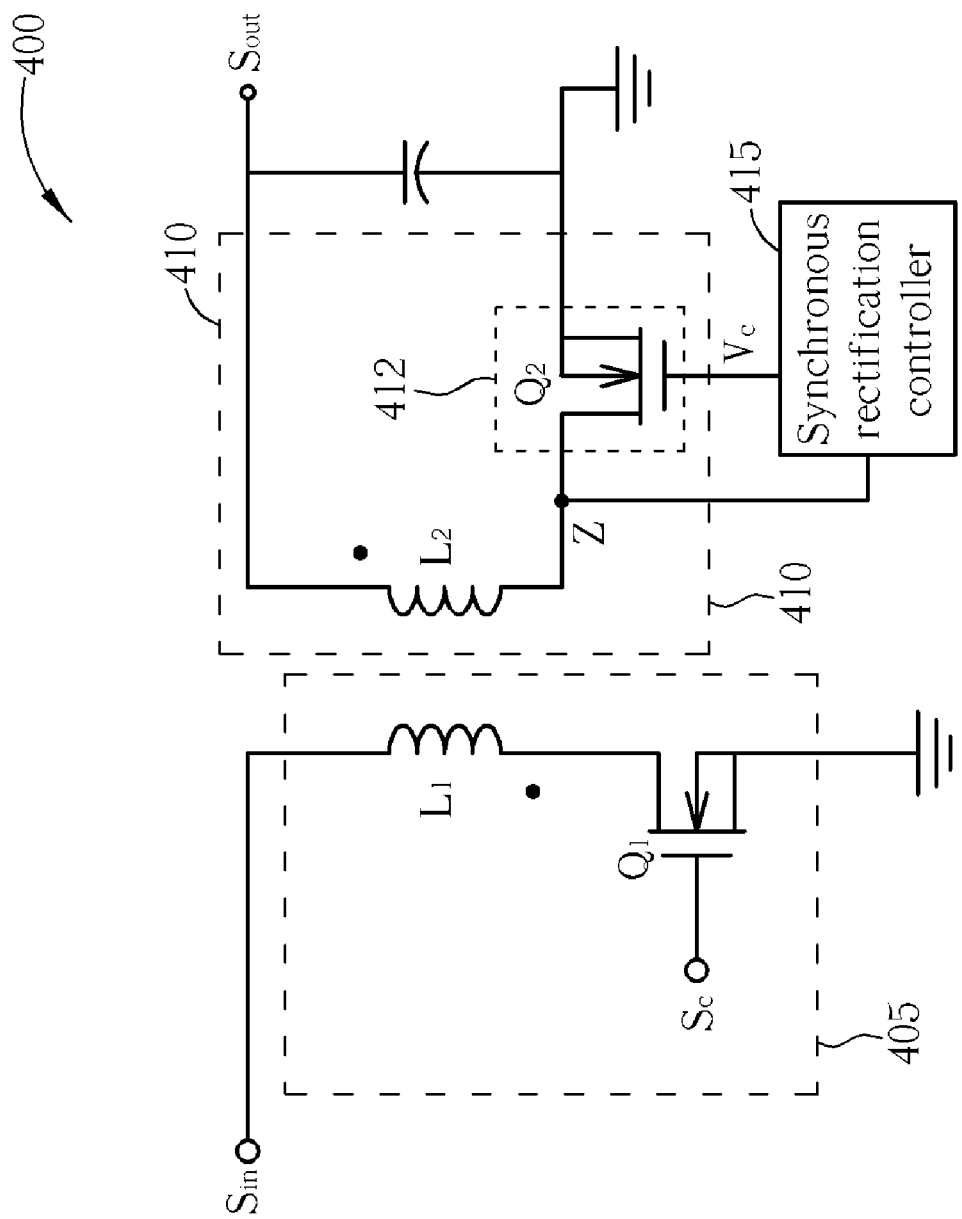
FIG. 4 is a diagram of an example of a prior art flyback voltage converter capable of avoiding power loss.
Figure 7:
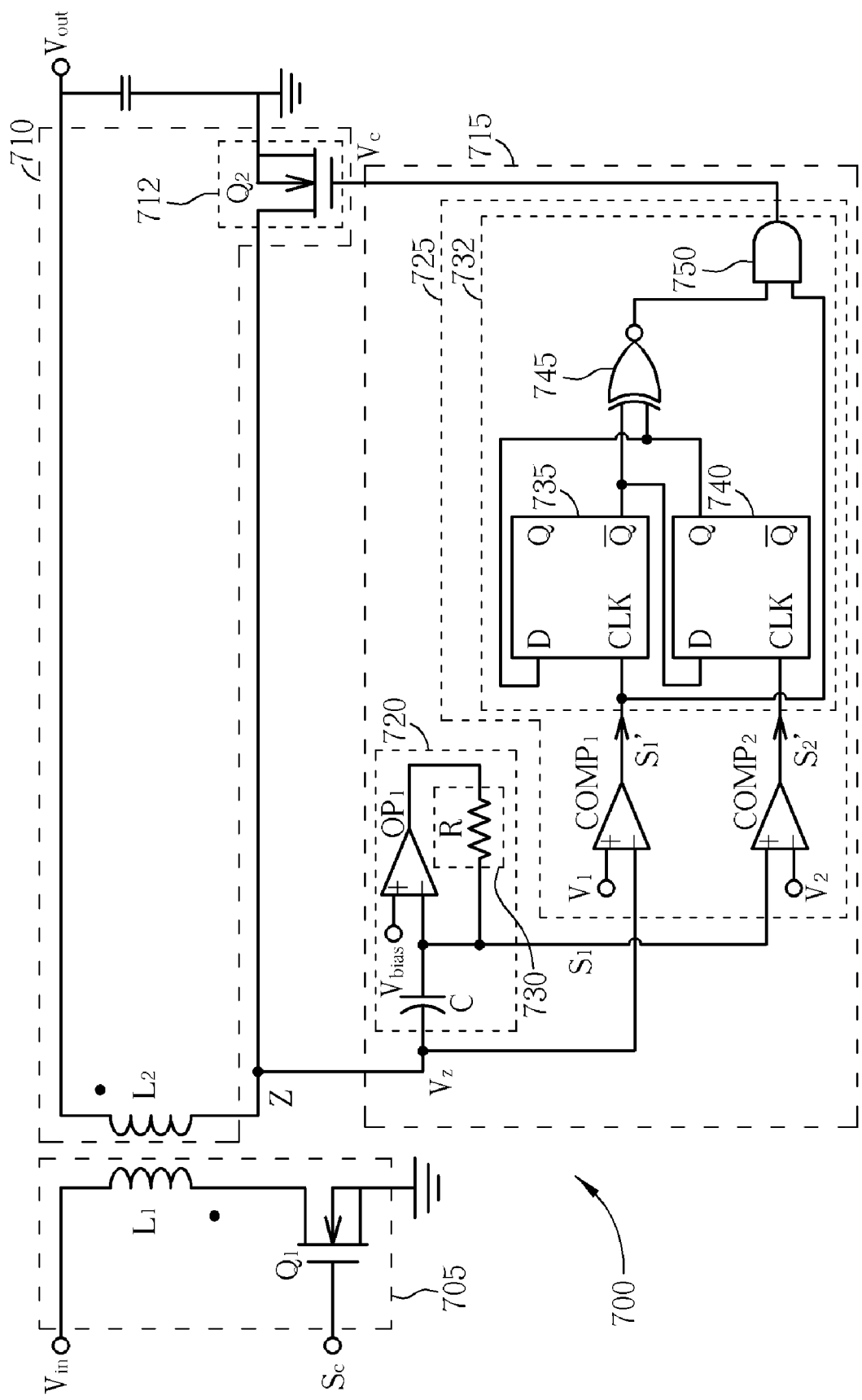
FIG. 7 is a diagram of an embodiment of a voltage converter according to the present invention.

Please refer to FIG. 7. FIG. 7 is a diagram of an embodiment of a voltage converter 700 according to the present invention. As shown in FIG. 7, the voltage converter 700 comprises a primary converting module 705, a secondary converting module 710, and a switch controller 715. The primary converting module 705 comprises a first electronic induction device $L_1$ and a transistor $Q_1$, and the secondary converting module 710 comprises a second electronic induction device $L_2$ and a switch device 712. The operation and function of the primary converting module 705 and secondary converting module 710 are identical to that of the primary converting module 405 and secondary converting module 410 shown in FIG. 4, and therefore are not detailed for brevity. In this embodiment, the switch controller 715 comprises a slope detecting circuit 720 and a decision circuit 725. The slope detecting circuit 720 comprises an operational amplifier $OP_1$, a resistance unit 730, and a capacitor C. In this embodiment, the resistance unit 730 is implemented with a resistor R only. This is not a limitation of the present invention, however. The slope detecting circuit 720 is utilized for measuring slope values of an output at a detection end of the second electronic induction device $L_2$ (in this embodiment, the detection end of the second electronic induction device $L_2$ is mean to be the second end of the second electronic induction device $L_2$, i.e. the slope detecting circuit 720 measures the slope values of transitions of the voltage level $V_z$ at the node Z) to generate a slope indication signal $S_1$ having different pulse amplitudes representative of different slope values. The decision circuit 725 comprises a plurality of comparators $COMP_1$, $COMP_2$, and a decision unit 732, where the decision unit 732 comprises a plurality of D-type Flip-Flops 735 and 740, an XNOR gate 745, and an AND gate 750. The decision circuit 725 is utilized for referencing the voltage level at the node Z (i.e. the voltage level $V_z$), the slope indication signal $S_1$ generated from the slope detecting circuit 720, a first predetermined reference level $V_1$, and a second predetermined reference level $V_2$ to generate a control signal $V_c$ for controlling an on/off status of the transistor $Q_2$. Further description is detailed as below.

Figure 5:
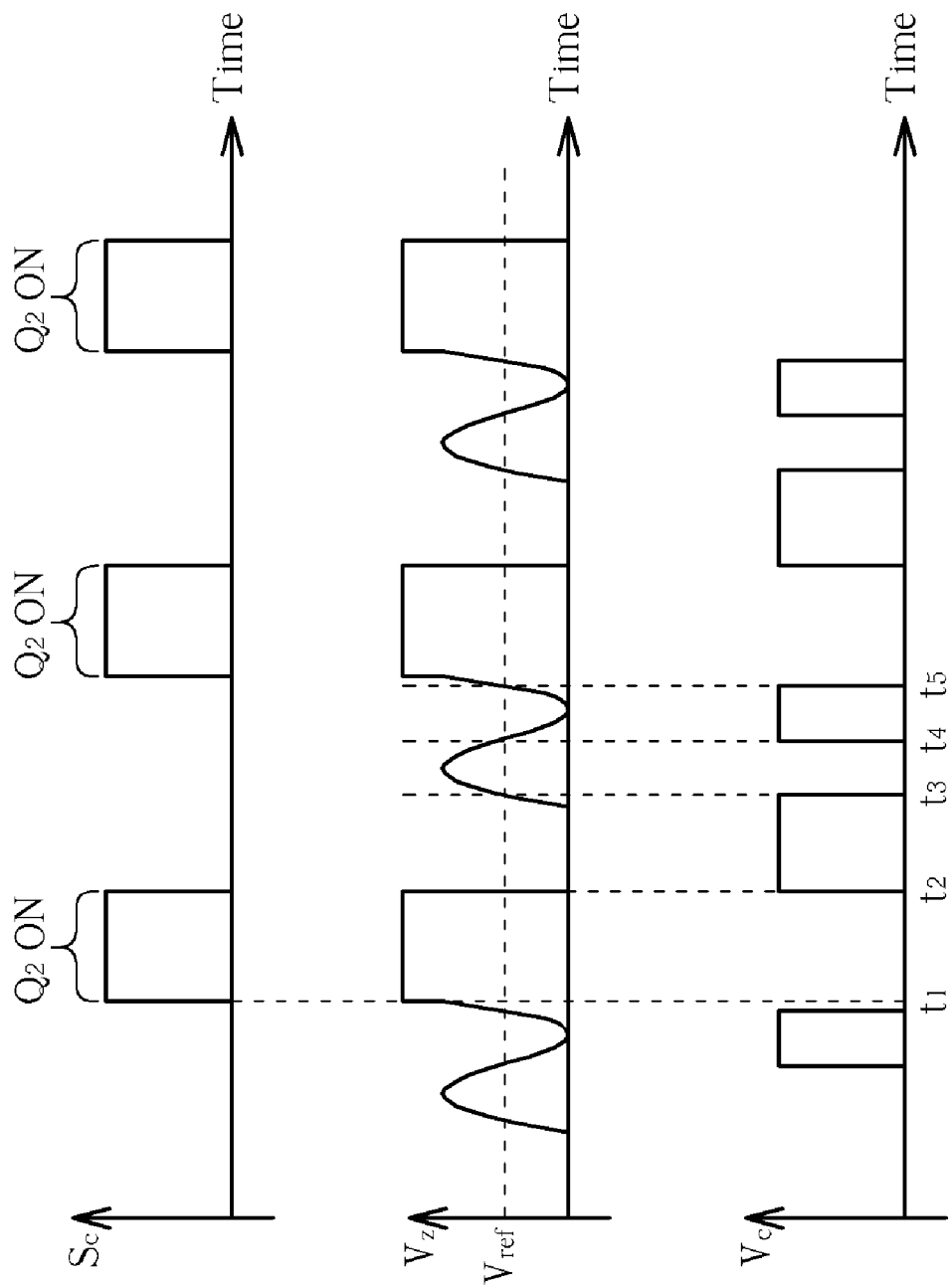
FIG. 5 is a timing diagram of an operation of the prior art voltage converter shown in FIG. 4 in discontinuous conduction mode.
Figure 6:
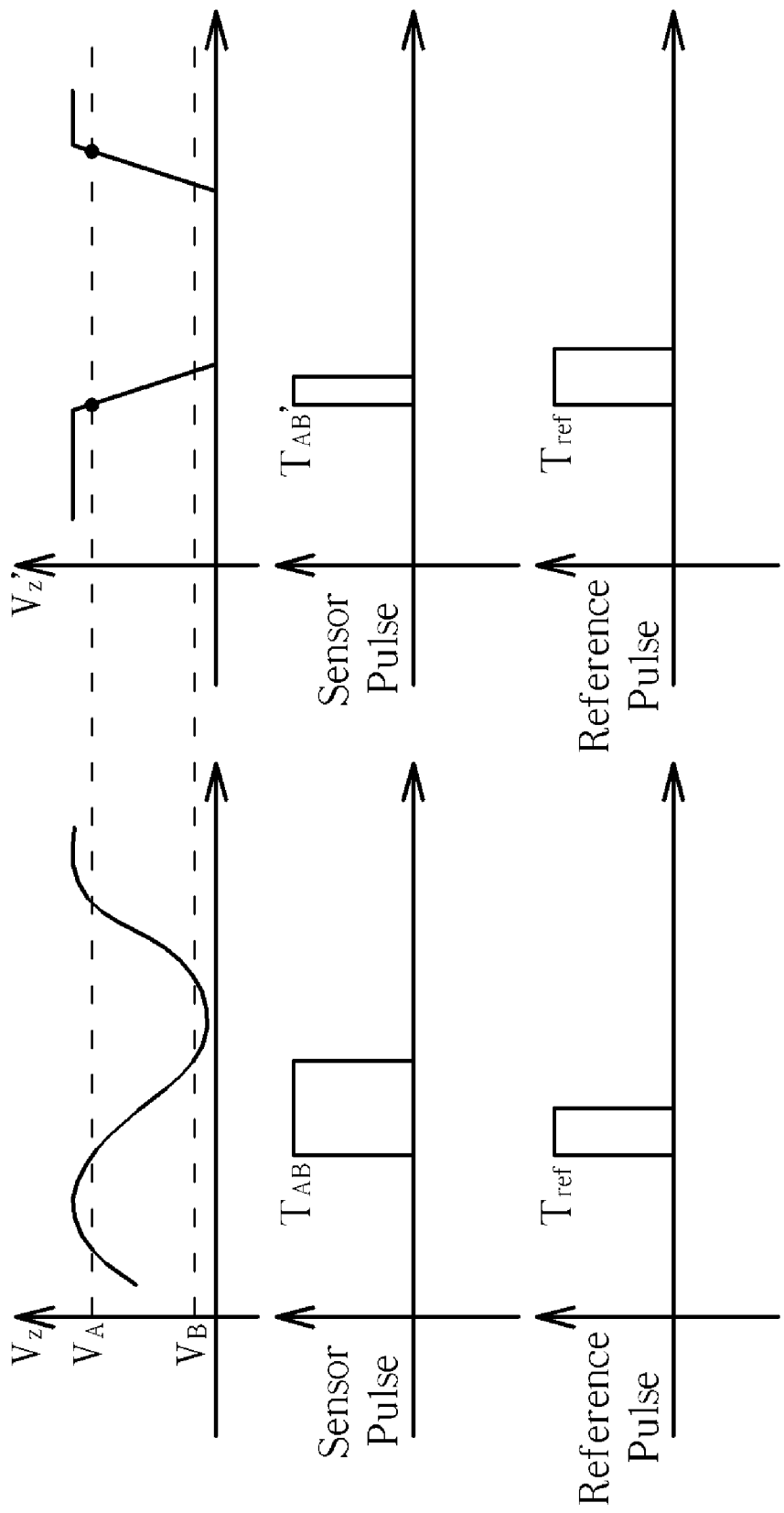
FIG. 6 is a sketch diagram illustrating two operation results of the prior art voltage converter shown in FIG. 4 according to different transitions of the voltage level and the reference pulse.
Figure 8:
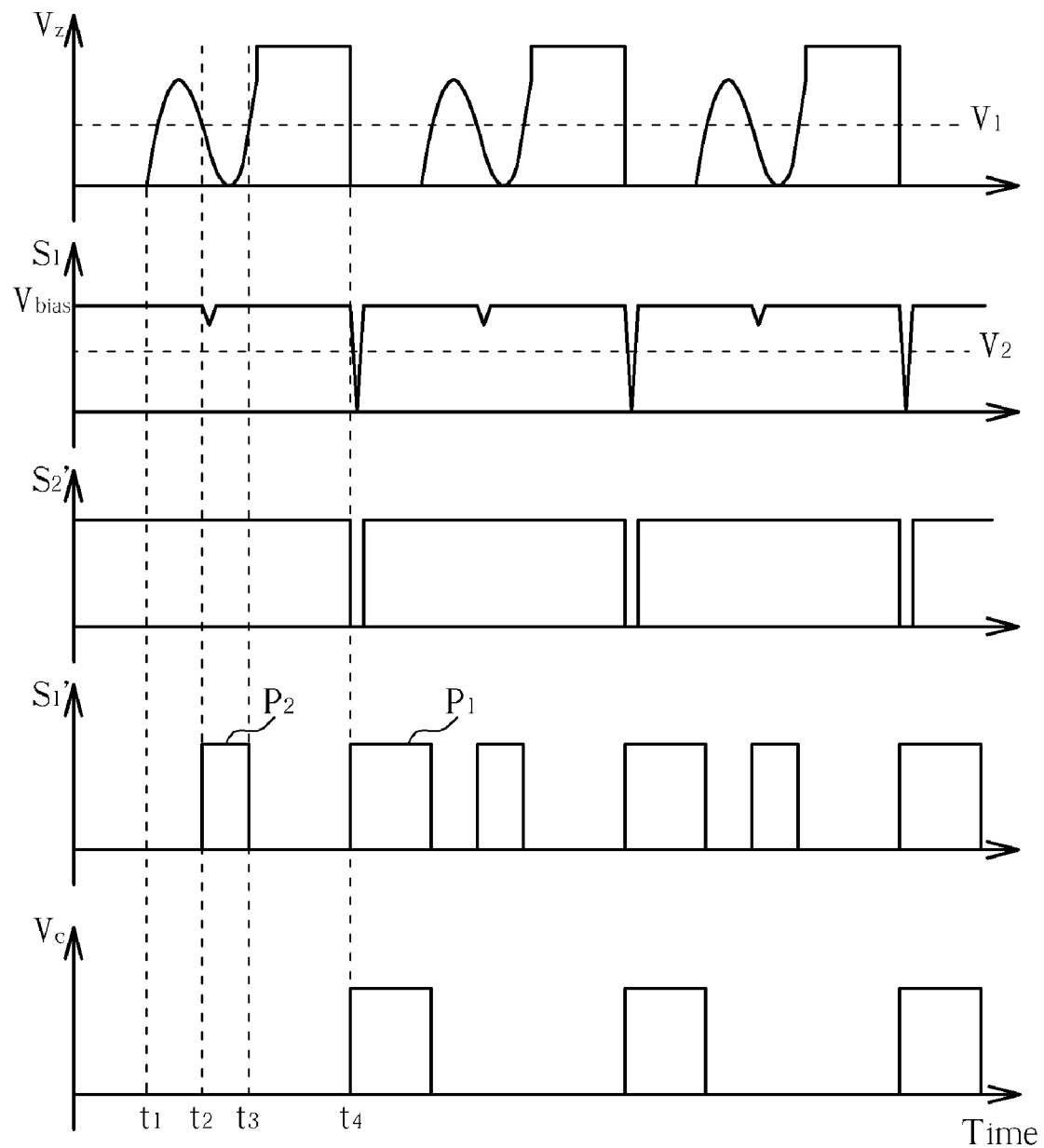
FIG. 8 is a timing diagram illustrating operation of the voltage converter shown in FIG. 7 while working in discontinuous conduction mode according to the present invention.

Please refer to FIG. 7 in conjunction with FIG. 8. FIG. 8 is a timing diagram illustrating operation of the voltage converter 700 while working in discontinuous conduction mode according to the present invention. As shown in FIG. 8, the waveform of the voltage level $V_z$ shown in FIG. 8 is similar to that shown in FIG. 5. During a time period $t_1 \sim t_3$, the node Z is similarly regarded as a floating node since the discharging process of the second electronic induction device $L_2$ is finished and the charging process of the first electronic induction device $L_1$ is not yet started. The voltage level $V_z$ therefore oscillates until the charging process of the first electronic induction device $L_1$ is started (i.e. the transistor $Q_1$ will be turned on at time $t_3$). After time $t_3$, the voltage level $V_z$ continues to remain at a high voltage level until the transistor $Q_1$ is turned off at time $t_4$ and the voltage level $V_z$ will be decreased immediately from the high voltage level to zero Volts at time $t_4$. In this embodiment, the slope detecting circuit 720 is implemented using a differential circuit well known to those skilled in the art; detailed operation is therefore not stated here for brevity. When the voltage level $V_z$ remains at a stable voltage level, the slope indication signal $S_1$ also remains at a high voltage level $V_{bias}$ shown in FIG. 8 since the non-inverting input of the operational amplifier $OP_1$ is coupled to the high voltage level $V_{bias}$. Once the voltage level $V_z$ oscillates, the slope indication signal $S_1$ will not remain at the voltage level $V_{bias}$ and will oscillate instead, as shown in FIG. 8. Please note that, for brevity, FIG. 8 only shows the voltage level $V_z$ oscillating from a higher voltage level to a lower voltage level and the corresponding change of the slope indication signal $S_1$. As mentioned above, it is assumed that a transition time of an oscillated voltage level $V_z$ is much longer than that of a stable voltage level $V_z$. That is to say, a transition slope of the oscillated voltage level $V_z$ is not sharper than that of the stable voltage level $V_z$. For example, a transition slope of the voltage level $V_z$ near time $t_2$ is not sharper than that of the voltage level $V_z$ near time $t_4$. Therefore, the slope indication signal $S_1$ has different pulse amplitudes representative of different slope values. The second predetermined reference level $V_2$ is utilized for separating a pulse amplitude near time $t_2$ from another pulse amplitude near time $t_4$. Therefore, by comparing the second predetermined reference level $V_2$ and the slope indication signal $S_1$, the comparator $COMP_2$ will output a second reference control signal $S_2'$ having a high logic level when the slope indication signal $S_1$ has a pulse amplitude above the second predetermined reference level $V_2$, or output a second reference control signal $S_2'$ having a low logic level when the slope indication signal $S_1$ has a pulse amplitude below the second predetermined reference level $V_2$.

In addition, the comparator $COMP_1$ also compares the voltage level $V_z$ and the first predetermined reference level $V_1$ to generate a first reference control signal $S_1'$ to determine the time during which the transistor $Q_2$ is conducted. The first reference control signal $S_1'$, however, will comprise a plurality of correct output pulses (e.g. an output pulse $P_1$) and a plurality of false output pulses (e.g. an output pulse $P_2$) due to the oscillation of the voltage level $V_z$. As mentioned above, the false output pulse (e.g. the output pulse $P_2$) will cause the transistor $Q_2$ to be conducted erroneously such that a great power loss is introduced. Therefore, the decision unit 732 is used for generating the control signal $V_c$ according to the first and second reference control signals $S_1'$, $S_2'$. The operation of the combination of the D-type Flip-Flops 735 and 740, the XNOR gate 745, and the AND gate 750 can be readily understood; further description is not detailed for brevity.

In another embodiment, the slope detecting circuit 720 can also detect the transition slope of the voltage level $V_z$ by detecting a transition of the voltage level $V_z$ from a low logic level to a high logic level. In this situation, the voltage level $V_{bias}$ will be coupled to a low voltage level. It is necessary for the voltage level $V_z$ to be inversed and then transmitted into the input of the slope detecting circuit 720. This also obeys the spirit of the present invention, and falls in the scope of the present invention.

In summary, by using the slope detecting circuit 720 and the decision circuit 725, the switch controller 715 can control the on/off status of the transistor $Q_2$ correctly without requiring the generation of the above-mentioned reference pulse. The voltage converter 700 can therefore be enabled correctly for avoiding a great power loss. Being compared to the synchronous rectification controller 415, a primary advantage of the switch controller 715 is that the waveform of the voltage level at the node Z in the voltage converter 700 can be more correctly estimated as either a stable waveform or an unstable waveform. The reason follows: only when the voltage level at the node Z transits very sharply (e.g. time $t_4$), the generated slope indication signal $S_1$ shown in FIG. 8 also transits sharply and therefore becomes lower than the second predetermined reference level $V_2$. Accordingly, the estimation for the waveform of the voltage level at the node Z is not easily affected by changes of the above-mentioned predetermined levels $V_A$, $V_B$ or other noise. Another advantage is that a starting timing of a pulse utilized for conducting the transistor $Q_2$ of FIG. 7 can be immediately outputted by the switch controller 715 (i.e. the waveform of the voltage level $V_c$ shown in FIG. 8) when detecting that the voltage level $V_z$ transits much sharply. The transistor $Q_2$ is turned on by the control signal $V_c$ almost immediately at time $t_4$, and additional power dissipation is not introduced. Accordingly, a total power efficiency of the voltage converter 700 is improved.

Additionally, although the embodiment of the present invention is applied in a flyback voltage converter, it can also be applied in a forward voltage converter. Taking an example of the forward voltage converter, the detection end of the second electronic induction device is mean to be the first end of the second electronic induction device, and the slope detecting circuit measures slope values of an output at the first end of the second electronic induction device to generate a slope indication signal having different pulse amplitudes representative of different slope values. The decision circuit references the first end of the second electronic induction device, the slope indication signal generated from the slope detecting circuit, a first predetermined reference level, and a second predetermined reference level to control an on/off status of a switch device coupled to the second of the second electronic induction device. This also obeys the spirit of the present invention.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A voltage converter for converting an input voltage signal into an output voltage signal, comprising:
   a primary converting module, comprising a first electronic induction device, coupled to an input port of the voltage converter;
   a secondary converting module, comprising:
   a second electronic induction device, coupled to the first electronic induction device, the second electronic induction device comprising a first end and a second end, wherein the first end of the second electronic induction device is coupled to an output port of the voltage converter; and
   a switch device, coupled to the second end of the second electronic induction device, for enabling the secondary converting module when switched on; and
   a switch controller, coupled to the switch device and the second electronic induction device, comprising:
   a slope detecting circuit, coupled to a detection end of the second electronic induction device, for measuring a slope of an output at the detection end of the second electronic induction device to generate a slope indication signal having different pulse amplitudes representative of different slope values; and
   a decision circuit, coupled to the slope detecting circuit and the switch device, for referencing the output at the detection end of the second electronic induction device, the slope indication signal, a first predetermined reference level, and a second predetermined reference level to generate a control signal for controlling an on/off status of the switch device;
   wherein the detection end of the second electronic induction device is selected from one of the first and second ends of the second electronic induction device.

2. The voltage converter of claim 1, where the primary and secondary converting modules comply with a flyback voltage converter configuration, and the detection end of the second electronic induction device is the second end of the second electronic induction device.

3. The voltage converter of claim 1, wherein the slope detecting circuit is a differential circuit, and the differential circuit comprises:
   a capacitor, having a first end coupled to the detection end of the second electronic induction device;
   a resistance unit, having a first end coupled to a second end of the capacitor; and
   an operational amplifier, having a non-inverting input end for receiving a third predetermined reference level, an inverting input end coupled to the second end of the capacitor, and an output end coupled to a second end of the resistance unit;
   wherein the slope indication signal is generated from the first end of the resistance unit.

4. The voltage converter of claim 3, wherein the decision circuit comprises:
   a first comparator, coupled to the detection end of the second electronic induction device, for comparing the output at the detection end of the second electronic induction device and the first predetermined reference level to generate a first reference control signal;
   a second comparator, coupled to the inverting end of the operational amplifier, for comparing the second predetermined reference level and the slope indication signal to generate a second reference control signal; and
   a decision unit, coupled to the first comparator and the second comparator, for generating the control signal according to the first and second reference control signals.

5. The voltage converter of claim 4, wherein the decision unit comprises:
   a first latch, having a clock input end coupled to the first reference control signal;

a second latch, having a clock input end coupled to the second reference control signal, a data input end coupled to an inverting data output end, and a non-inverting data output end coupled to a data input end of the first latch;

a XNOR gate, having two input ends coupled to the inverting data output end of the first latch and the non-inverting data output end of the second latch; and an AND gate, having two input ends coupled to an output end of the XNOR gate and the first reference control signal, for generating the control signal to the switch device.

6. A method for converting an input voltage signal into an output voltage signal, comprising:

provicing a primary converting module having a first electronic induction device and coupling the primary converting module to an input port of the voltage converter;

providing a secondary converting module comprising a second electronic induction device and a switch device, coupling one of a first end and a second end of the second electronic induction device to an output port of the voltage converter and coupling the second end of the second electronic induction device to the switch device, and utilizing the switch device to enable the secondary converting module when the switch device is switched on;

measuring a slope of an output at a detection end of the second electronic induction device to generate a slope indication signal having different pulse amplitudes representative of different slope values; and referencing the output at the detection end of the second electronic induction device, the slope indication signal, a first predetermined reference level, and a second predetermined reference level to generate a control signal for controlling an on/off status of the switch device;

wherein the detection end of the second electronic induction device is selected from one of the first and second ends of the second electronic induction device.

7. The method of claim 6, further comprising: coupling the primary and secondary converting modules utilizing a flyback voltage converter configuration; and selecting the second end of the second electronic induction device for the detection end of the second electronic induction device.

8. The method of claim 6, wherein the step of measuring the slope of the output at the detection end of the second electronic induction device comprises:

differentiating the output at the detection end of the second electronic induction device to generate the slope indication signal.

9. The method of claim 6, wherein the step of generating the control signal to control the on/off status of the switch device comprises:

comparing the output at the detection end of the second electronic induction device and the first predetermined reference level to generate a first reference control signal;

comparing the second predetermined reference level and the slope indication signal to generate a second reference control signal; and generating the control signal according to the first and second reference control signals.

* * * * *